2,849,566

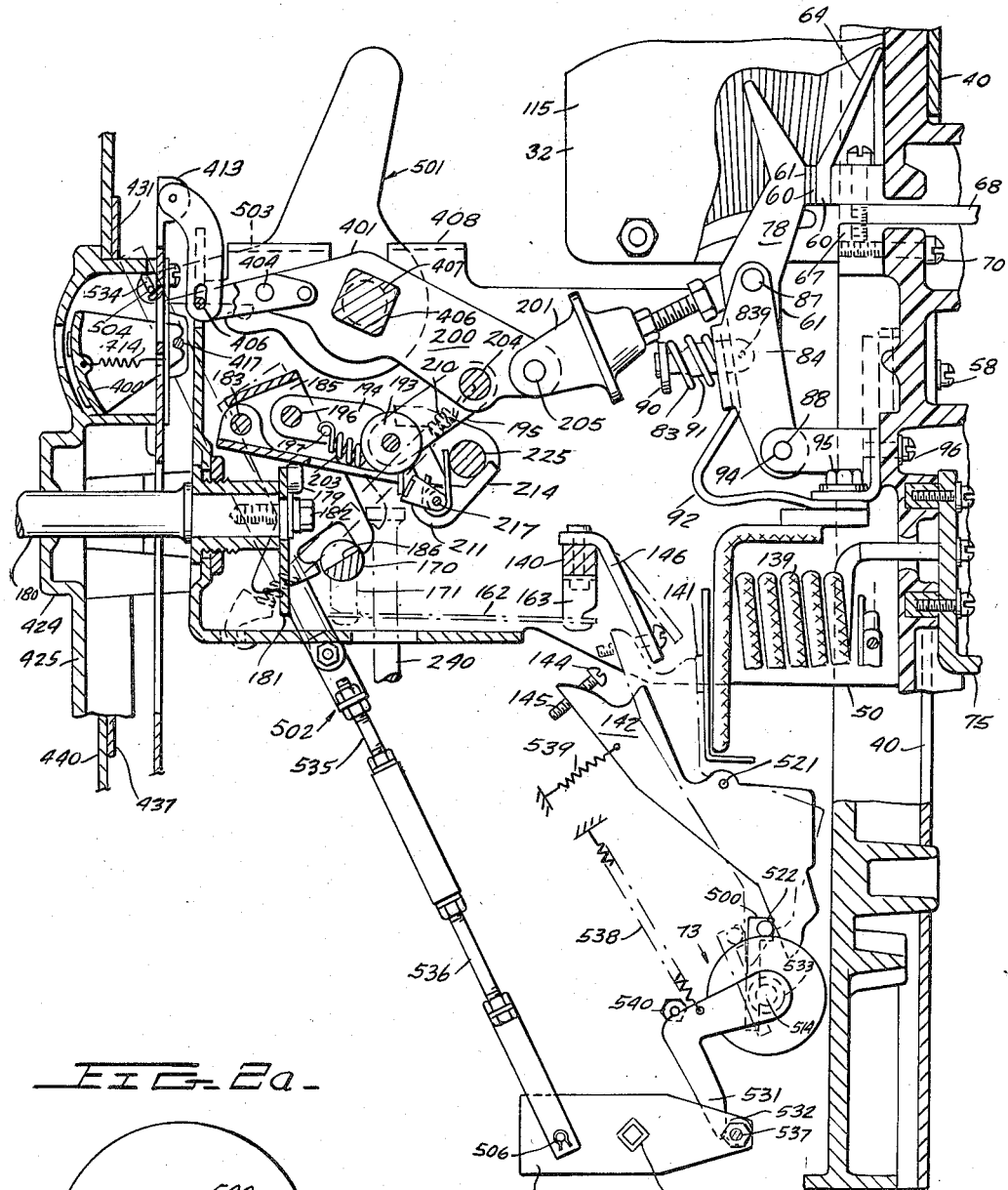
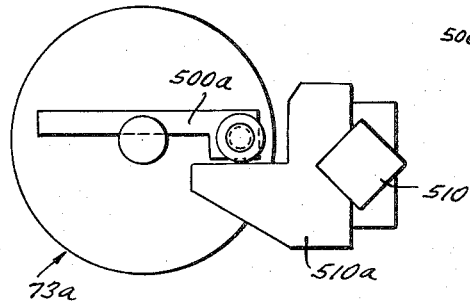
Fig. 2
Fig. 2a
INVENTORS
FRANK JOSEPH POKORNY
RICHARD G. SHOULBERG
BY
Ostrolenk & Faber
ATTORNEYS

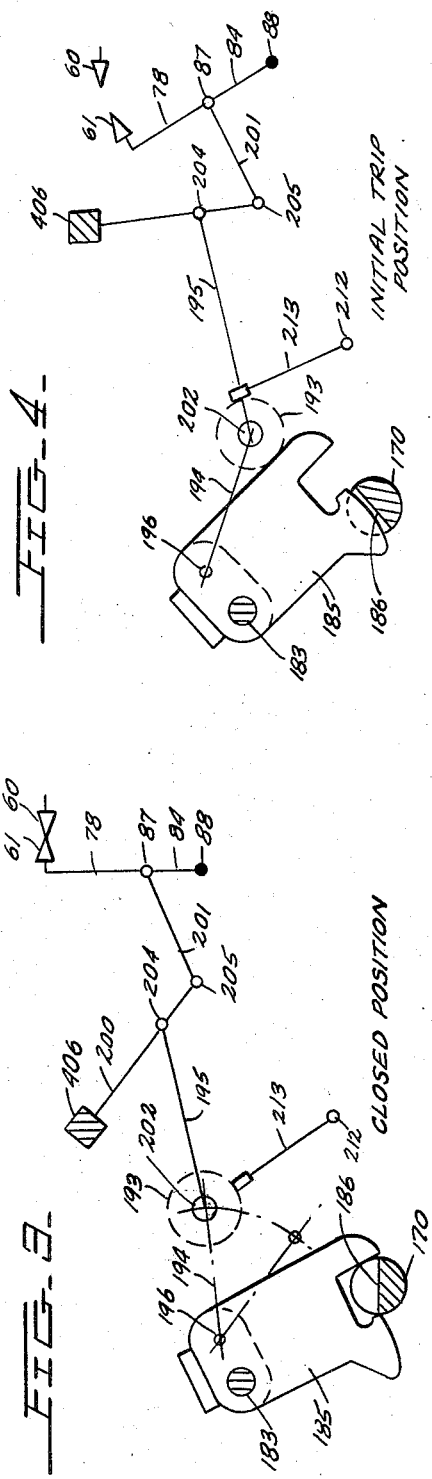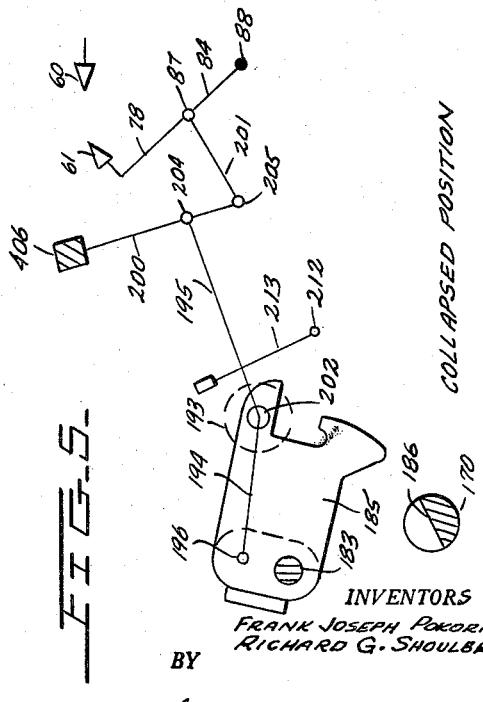

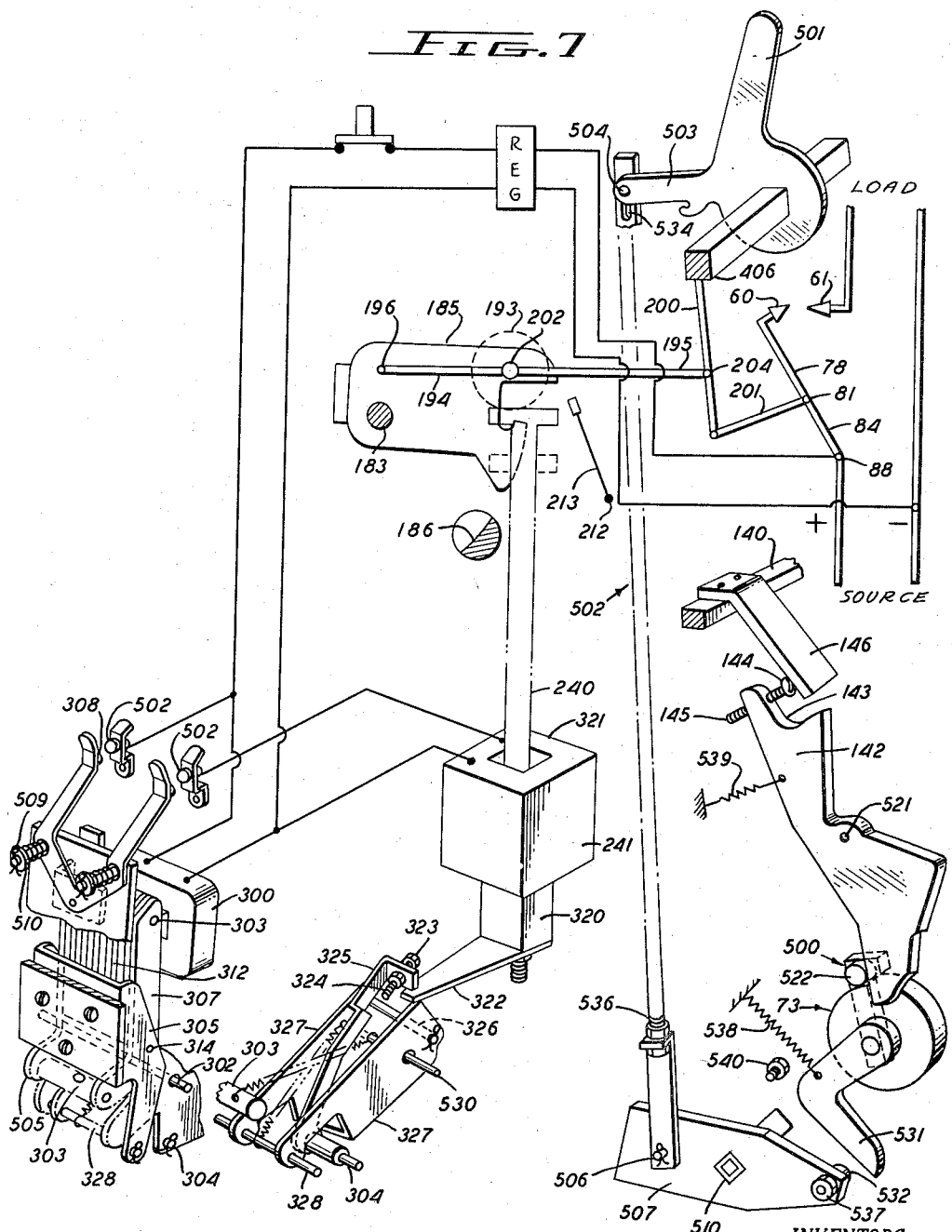

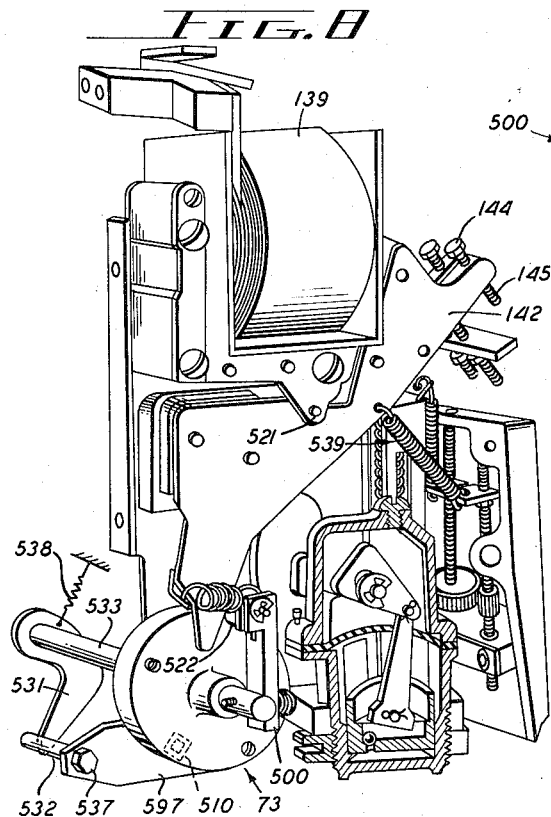
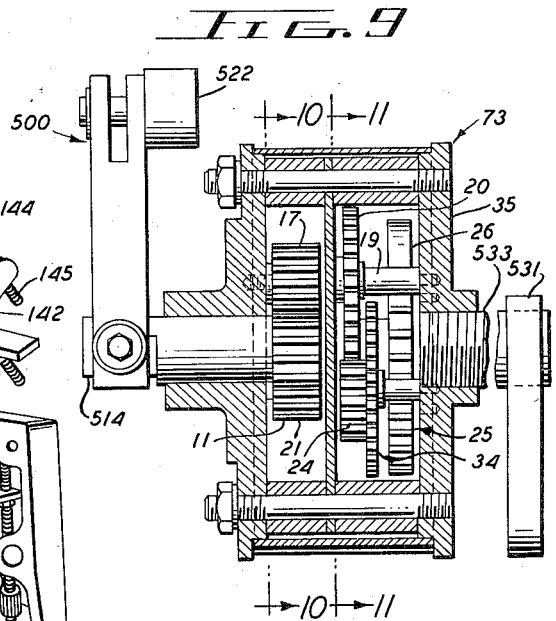
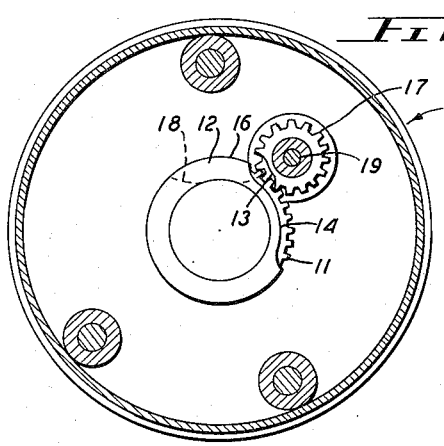
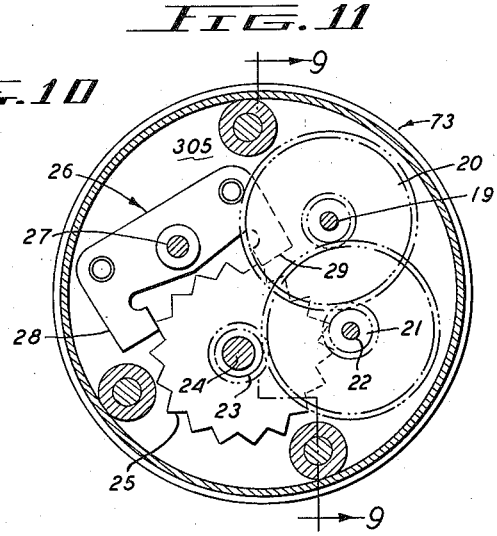
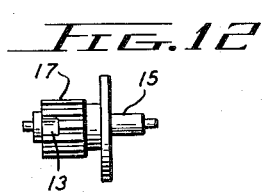
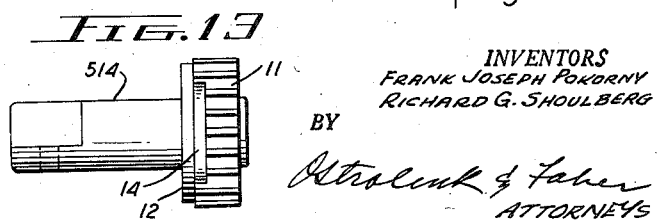

PROTECTION FOR CIRCUIT BREAKER IN CLOSING AGAINST FAULT CONDITIONS

Frank Joseph Pokorny, Hatboro, and Richard G. Shoulberg, Plymouth Meeting, Pa., assignors to I-T-E Circuit Breaker Company, Philadelphia, Pa., a corporation of Pennsylvania Application July 22, 1954, Serial No. 445,122

5 Claims. (Cl. 200—98)

Our invention relates to selective trip circuit breakers and is more particularly directed to a novel arrangement to permit instantaneous trip-free operation of the interrupter when it is closed on a fault. Our invention is related to novel means to enable a time delay circuit breaker used in a selective strip system to instantaneously trip open when it is manually or automatically closing on a fault and is an improvement of the arrangement shown in Patent No. 2,536,775, issued January 2, 1951, to William M. Scott, Jr., entitled Circuit Breaker Tripping Mechanism, assigned to the assignee of the instant invention.

Selective trip systems such as described in Patent No. 2,648,803, issued August 11, 1953, to Joseph Wood, entitled Cascaded Breaker System, Patent No. 2,486,602 issued November 1, 1949, to Otto Jensen et al., entitled Timing Device, assigned to the assignee of the instant invention and Patent No. 2,439,165, issued April 6, 1948, to H. C. Graves, Jr., entitled Selective Tripping of Circuit Breakers in a System, provided with circuit breakers of the type shown in Patent No. 2,439,165 assigned to the assignee of the instant invention, have time delay characteristics for all current values up to the interrupting capacity of the circuit breaker. Thus, except for severe short circuit currents, the circuit breaker always opens with either long or short time delay characteristics.

These circuit breakers can properly protect the system when fault or short circuits occur. When the circuit breaker is latched in the closed position the short and long time delay tripping will not harm the interrupter or the system during the period of time delay. However, if a fault exists on the line at the time when an attempt is made to automatically or manually close the circuit breaker, the circuit breaker may be severely damaged.

That is the magnetic force set up in the loop consisting of the movable contact will tend to force the contacts toward their open position and since this force may be larger than the force tending to close the breaker the mechanisms will move to the open position.

Thus, if the circuit breaker is provided with time delay characteristics the trip latch is not disengaged during closing and hence the circuit breaker is not trip-free. That is, if the closing force is not sufficient to close and latch the contacts against the fault line then the opening of the breaker will not be trip-free.

This may result in either injury to the person attempting to manually close the breaker or in pumping operation of the breaker, if it is being automatically closed.

It is also noted that if the contacts do not latch when the circuit breaker is closed on a fault line, the arcing contacts may remain in engagement or chatter, thus causing excessive damage to the components of the circuit breaker. That is, since the arcing contacts may remain in engaged position until the time delay for the overcurrent armature has run out the arcing contacts will be damaged since they are not designed to carry current for any appreciable length of time.

In order to prevent this undersirable condition, I pivotly mount the timer mechanism housing so that it can be selectively rendered operative or inoperative, depending on the position of the cooperating contacts. During the opening movement of the circuit breaker, the timer housing is unlatched and same is latched in position only when the main contacts have re-engaged (i. e. latched closed).

Thus, the circuit breaker has instantaneous trip characteristics only during the closing operation. That is, when the timer housing is unlatched, it is free to rotate and hence will not introduce any time delay in the event the breaker is closed on an overcurrent fault. That is, the circuit breaker will have high speed trip characteristics during the closing period and time delay characteristics after the circuit breaker is latched closed.

With this arrangement if an attempt is made to close the interrupter on a fault line the trip latch will be released, as soon as fault current commences to flow even though the prop latch is not moved to latch position. Thus, trip-free operation will occur as a result of the instantaneous tripping.

Hence, with this arrangement there will be no kick back forces on the manual closing means or on the automatic closing means or damage to the arcing contacts as a result of an attempted closing on a fault line.

It will be noted that there are several other novel methods to achieve the above noted desired results. For example, copending application Serial No. 445,123, filed July 22, 1954, assigned to the assignee of the instant application, provides an instantaneous armature which is normally blocked to prevent operation thereof. However, it is unblocked during the opening operation to permit instantaneous trip if the circuit breaker is closed on a fault line. Co-pending application Serial No. 445,094, filed July 22, 1954, assigned to the assignee of the instant application provides means operatively connected to the circuit breaker and timer arm which will remove and maintain the timer arm from the path of movement of the trip armature during the period that the circuit breaker is opened and until the circuit breaker is again latched closed.

Co-pending application Serial No. 445,124, filed July 22, 1954, assigned to the assignee of the instant application, provides an arrangement wherein the entire timer housing is rotated during the opening operation to thereby permit instantaneous operation when the circuit breaker is closed on a fault.

Accordingly, a primary object of our invention is to provide a novel arrangement for selective trip circuit breakers wherein high speed or instantaneous tripping occurs for any magnitude of overcurrent or fault current only during the closing operation of the circuit breaker due to the unlatching and thus free mounting of the timer housing during the opening operation and thereafter when the circuit breaker is latched closed, it has time delay characteristics.

Another object of our invention is the provision of a novel latch arrangement for a pivotally mounted timer housing so that the time delay means is unlatched during the opening operation of the circuit breaker and is not relatched until the contacts are in engaged position.

A still further object of our invention is to provide a novel latch for the time delay housing of a circuit breaker wherein the time delay unit is rendered ineffective during the closing operation without disturbing either the timer arm or timer housing.

These and other object of our invention will be apparent from the following description when taken in connection with the drawings in which:

Figure 1 is an exploded perspective view of an operating mechanism of a circuit breaker and shows the cooperating contacts in a disengaged fully open position. This figure illustrates our novel device to unlatch the pivotally mounted timer housing during the opening operation of the circuit breaker. In this arrangement the housing remains unlatched until the contacts are latched closed, at which time the timer housing is fixed in position.

Figure 2 is a side view of the circuit breaker of Figure 1 and illustrates the position of the various components when the cooperating contacts are latched closed. This figure illustrates the manner in which our novel means prevent rotation of the timer housing so that subsequent automatic tripping of the circuit breaker will occur with time delay.

Figure 2A shows a modified form of the timer element shown in Figure 2.

Figure 3 is a schematic view of the circuit breaker of Figures 1 and 2 and illustrates the position of the various components when the circuit breaker is in the fully closed position of Figure 2. This figure illustrates the latched position of the trip latch and prop latch.

Figure 4 is a schematic view of the circuit breaker of Figures 1 and 2 and illustrates the initial trip position.

Figure 5 is a schematic view of Figures 1 and 2 and illustrates the position of the various components when the circuit breaker is in the collapsed position, prior to the relatching of the trip latch.

Figure 6 is a schematic view of Figures 1 and 2 illustrating the position of the components when the circuit breaker is in the fully open position of Figure 1 with the trip latch re-engaged.

Figure 1:
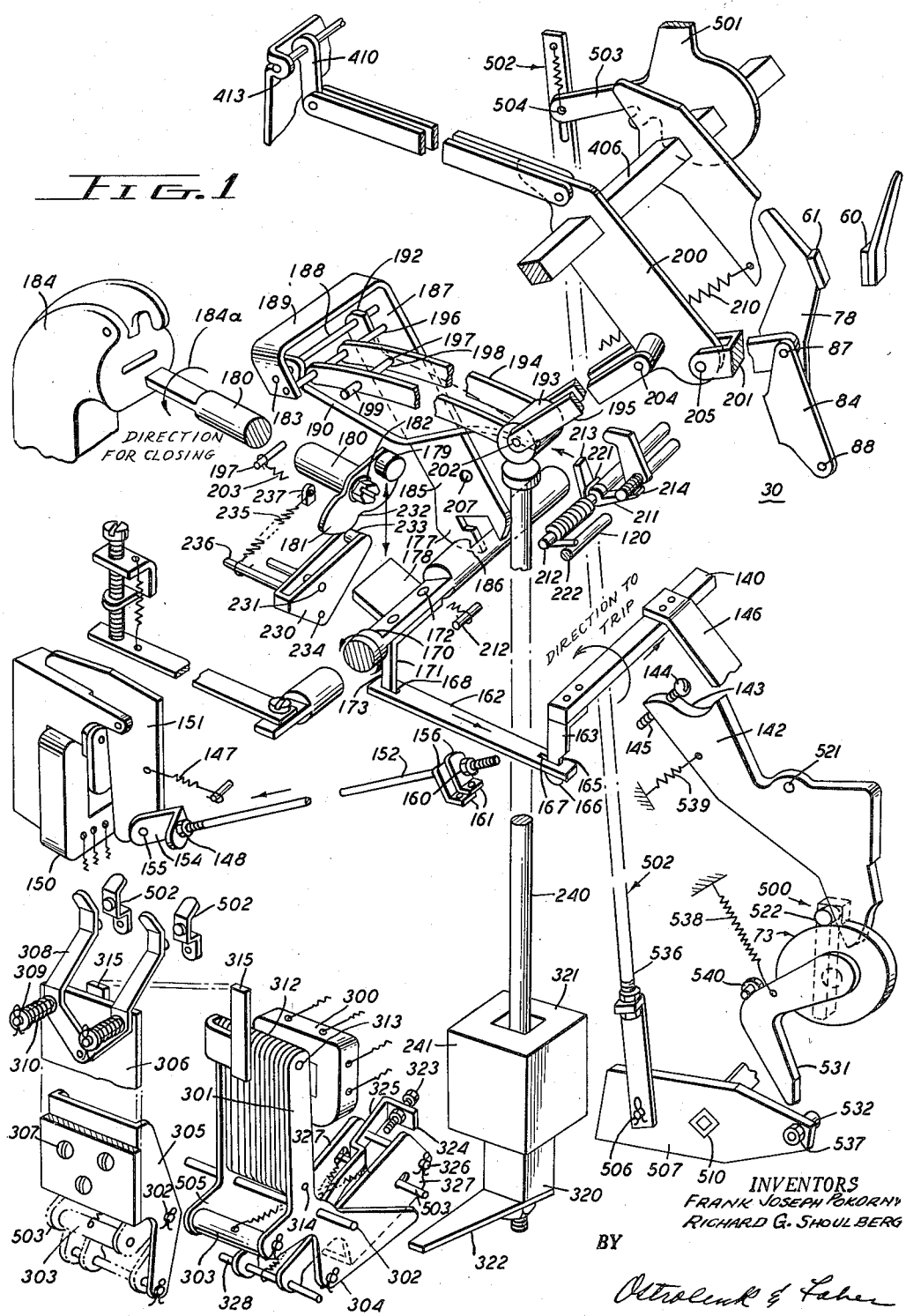

Figure 7 is a schematic view of the circuit breaker of Figures 1 and 2 and illustrates the position of the circuit breaker in the trip-free position. This figure also illustrates the latched control relay and closing solenoid which comprises the automatic closing means for the circuit breaker. This figure further illustrates our novel means to render the escapement device ineffective until after the contacts have latched closed.

Figure 8 is a view in perspective, partially broken away, of the complete long and short time delayed trip armatures and control means thereof.

Figure 9 is a sectional view of the short time delay mechanism taken in the direction of the arrows 9—9 of Figure 11.

Figure 10 is a view partly in section of the short time delay mechanism taken in the direction of the arrows 10—10 of Figure 9.

Figure 11 is a view partly in section of the short time delay mechanism taken in the direction of the arrows 11—11 of Figure 9.

Figure 12 is a side view of the run off pinion and shaft of the short time delay mechanism of Figure 8.

Figure 13 is a side view of the run off gear assembly of the short time delay mechanism of Figure 9.

Referring to the figures, on the occurrence of an overcurrent condition, an energized coil 139 aided by the core 141 pulls the armature 142 against the bias of spring 539. The armature 142 has a screw 145 threaded at one end thereof and which is used to effect an adjustable contact with the initial tripping member 140. The head 144 of the screw 145 acts to rotate bar 140 upon the energizing of the coil 139 by hitting extension plate 146 which is bolted to the shaft 140. When the head 144 hits the end of the extension plate 146, the shaft 140 is caused to rotate in a counterclockwise manner looking from the right of the circuit breaker 30, which is the view of Figure 1.

The speed of the armature 142 of the overcurrent trip coil 139 is controlled by the timer arm 500 which is pivoted on shaft 514 of the timer mechanism. The timer arm 500 is secured to the short time delay timer escapement mechanism which is identified by the numeral 73 in U. S. Patent 2,769,057, issued October 30, 1956, to Carl Thumim, entitled Time Delay Circuit Breaker, U. S. Patent 2,704,311, issued March 15, 1955, to Carl Thumim, entitled Time Delay Circuit Breakers, and assigned to the assignee of the instant invention.

The short time delay escapement mechanism for the timer arm 500 may be identical to that described in the above identified co-pending applications and forms no part of the instant invention.

However, a brief description of the unit will be given so that a complete understanding of how the rotation of the timer arm 500 during the opening operation of the circuit breaker serves to defeat the short time delay for the overcurrent trip armature 142. Basically, the short time delay mechanism 73 shown in detail in Figures 8 to 13 inclusive, is a mechanical escapement mechanism having a verge 26 which controls the speed of rotation of the timer arm or lever 500. Timer arm 500 bears against the lower extension of the short time armature 142 so that when the short time armature 142 moves from the full open position of Figure 2 to the tripping position and before it completes its full trip movement (dotted view of Figure 2) it must rotate the timer arm 500 in a counterclockwise direction as the armature 142 is rotated in a clockwise direction.

The armature 142 cannot rotate toward tripping position without rotating the timer arm 500 in a counterclockwise direction. The escapement mechanism is in the short time delay housing 73 and secured to the time arm 500 through the shaft 514.

Hence, the escapement mechanism 73 controls the speed of movement of the armature 142 in its movement toward the trip position of the circuit breaker.

The escapement mechanism, as seen particularly in Figures 9 to 13, is comprised of a housing 73, a shaft 514 extending therefrom. The timer arm 500 is mounted on one end of the shaft 514. The other end of shaft 514 carries a segment gear 11 and a plate 12 (see also Figure 13). Segment gear 11 meshes with pinion 17 which is provided with a recess 13 (see also Figure 12) registering with the shrouding plate 12. As the shaft 514 is turned, the segment gear 11, which meshes with the pinion 17, rotates pinion 17 until the segment gear 11 escapes from the pinion 17. The shrouding plate 12 is recessed at 14 below the level of the teeth 15 of the segment gear 11 so that it does not interfere with the meshing engagement between teeth 15 of segment gear 11 and the teeth of pinion 17.

After the full time relay has been achieved, it is necessary that the armature escape the time delay mechanism. At this time the shrouding plate 12, and particularly portion 16 thereof, comes into registry with the recess 13 of the pinion 17, thereby holding the pinion 17 stationary while the shrouding plate 12 and the shaft 514 may rotate readily with respect thereto.

The segment gear 11 is cut away at 18 so that it will not obstruct the movement of segment gear 11 at this run off position.

Consequently, the movement of teeth 15 of the segment gear 11 driving the initial movement of the armature 142 is time delayed thereby delaying the rotation of the timer arm 500 and resulting in a time delay for the armature 142. However, when the armature reaches the half-way point the segment gear 11 disengages tooth engagement with pinion 17 permitting an unrestrained stroke of the armature 142 to engage with tripper bar 146 with a hammer blow.

In order to avoid misalignment between the parts of the escapement mechanism, the engagement of the raised portion 16 of the shrouding plate 12 in the recess 13 of the pinion 17, holds the pinion 17 and the associated mechanisms hereinafter described in the position they held at the time the teeth 15 of gear segment 11 left pinion 17 so that during the return movement when teeth 15 engage the pinion 17, the relationship between teeth 167 the raised portion 16 of shrouding plate 12 re-establishes mesh engagement of the teeth of segment gear 11 and the teeth of pinion gear 17.

Thus, in order to achieve the short time delay, it is necessary to selectively delay the rotation of the pinion 17. Pinion 17 is carried on shaft 19 which carries the gear 20. Gear 20 meshes with gear 21 on shaft 22 which carries the gear 34. Gear 34 meshes with gear 23 on shaft 24 which carries the latched escapement rack 25.

Verge 26 rotatable on pin 27 has appropriate teeth 28, 29 which alternately engage with the teeth of escapement wheel 25 and limits its speed of rotation by the speed with which the teeth 28 and 29 of the verge 26 can successively escape the wheel 25 by oscillation of the verge 26. The planes of the teeth of the escapement wheel 25 are so oriented that the direction of the force lines between wheel 25 and verge teeth 28 falls outside of verge pivot 27 by a definite amount. The resulting movement causes the speed of oscillation of verge 26 to vary in direct proportion to the magnitude of the force impressed on it by wheel 25.

Thus, as has been pointed out, the rotation of armature 142 to the trip position causes its end to rotate the timer lever 500 of the short time mechanism 73 which is secured to the shaft 514 and which, through the above set forth mechanism, operates the timer mechanism to effect short time delay in restraint of clockwise rotation of armature 142, the greater the force executed by armature 142, the greater the speed of oscillation of verge 26 and the shorter the time delay.

The entire time delay housing 73 is mounted on a shaft which is in threaded engagement with threaded section 33 in wall 35 of the housing 73. The housing 73 may be rotatably adjusted wherein a greater or less number of teeth of the gear segment 11 must pass in engagement with the pinion 17 before the run off condition is achieved wherein extension 16 of the shrouding plate 12 passes freely through the recess 13 of the pinion 17 while the recess 18 in the gear segment 11 permits free rotation of the gear segment 11 past the pinion 17.

The short time delay armature 142 is used for the purpose of obtaining a short time delay expressed in cycles for currents exceeding a given minimum value. This is in contrast to the long time delay armature 142 (Figure 8) which is used for the purpose of obtaining a long time delay expressed in seconds or in minutes for current values in the recognized range of overcurrents and also for the purpose of obtaining an instantaneous trip for short circuit or other high values of fault current.

The instant invention is directed to means to remove the timer arm 500 from the path of movement of the over current relay armature 142 during the manual or automatic closing of the circuit breaker. Although the circuit breaker per se, with which our novel arrangement may be coordinated, forms no part of the instant invention, a description of the operation of the unit will now be given in order to understand the cooperation between the components of our invention and the operation of the circuit breaker.

The shaft 140 is caused to rotate by means of the shunt trip coil 150 which upon being energized pulls an armature member 151 to it. The member 151 has a link 152 rigidly attached to one end of member 151 by means of an angle 154. The link 152 is attached to the angle 154 by means of a threaded portion 199 of link 152 which enters the angle 154 and a nut 18. The angle 154 is movably attached to the member 151 by means of a pin 155. A restoring spring 147 attached to the member 151 resets the armature upon de-energization of the coil 150.

The link 152 is attached to the shaft 140 by means of another angle 156. The angle 156 is attached to the shaft 140 by means of bolts passing through hole 161 in angle 154 and shaft 140 and the link 152 by means of a cap 160. The cap 160 is movably attached to the link 152. Thus, the shaft 140 can now be caused to rotate by two methods, one due to the energization of the overcurrent trip coil 139 and the other due to the energizing of the coil shunt trip 150. The coil 150 is remotely caused to be energized and is usually accomplished by manual operation of a remote push-button switch. The rotation of shaft 140 causes a link 162 to be moved by means of an angle 163 which is bolted to the shaft 140. The angle 163 has an indentation 165 near the farthest edge 166 from the shaft 140. The link 162 has two slots 168 and 167. The slot 167 engages the indentation 165 of the angle 163.

The translatory movement of link 162 causes the rotation of a milled shaft 170. The milled shaft 170 has another angle 171 rigidly attached to it by means of two bolts 172. This angle has an indentation near the end which is farthest from the shaft 170. The indentation 173 of angle 171 engages the slot 168 of link 162. Thus, the rotation of shaft 140 causes the rotation of milled shaft 170. When milled shaft 170 rotates to release a latch 177, as is hereinafter described, the circuit breaker movable contacts 60, 61 are allowed to be disengaged from the stationary contacts.

The angle 171 described above has an abutment 178. This abutment 178 is engaged by a roller 179 which is rotated manually by means of the closing handle 184 attached to the shaft 180. Shaft 180 has a crank 181 which is rigidly attached to the shaft 180 by means of a screw 182. The roller 179 is attached to one end of the crank 181. When the shaft 180 is rotated by the closing handle 184, the roller 179 engages abutment 178 of angle 171 and rotates milled shaft 170. Thus, milled shaft 170 can be made to rotate by a plurality of methods to open the circuit breaker 30. It can be made to rotate manually by means of closing handle 184; it can be made to rotate by means of an overcurrent condition in trip coil 139 and it can be made to rotate by means of an excitation of shunt trip coil 150, as described above.

The latch 177 is an integral part of trip arm 185. The latch 177 engages the milled shaft 170 so that a small revolution of shaft 170 releases the latch 177, as hereinafter described. The shaft 170 is milled slightly past center at 186. The trip arm 185 is pivoted at 187 on a long pin 188. The pin 188 is also engaged on the trip arm extension 189 at point 183. The movable arm 190 is pivoted on pin 188 and extends beneath a roller 193. The roller 193 is the pivot point of a toggle mechanism consisting of two links 194 and 195 and is carried by a pin 202 which pivots the meeting of links 194 and 195 which are each comprised of two arms. Arm 194 is pivoted on floating pin 196 and arm 195 is pivoted on pin 204.

The arms 194 support a rod 197 at 198 and 199, respectively. The rod 197 carries one end of a restoring spring 203 which is tensed by means of a stationary shaft 212. The restoring spring 203 exerts a tension on the link 194 which tends to open or break the toggle mechanism. Link 194 is pivoted on a floating pin 196, which is supported by link arm 185 and its extension 189 being parallel to the pin 188. The other link 195 of the toggle is pivoted on movable link 200 which is connected by means of an adjustable insulator 201 to the movable contact assembly 61 and pivoted on contact bar 406.

When the toggle mechanism consisting of links 194 and 195 is straightened out by means hereinafter described, pressure is put on movable link 200 by means of link 195 and bearing pin 204. The movable link 200 is pinned to insulator 201 by pin 205 and moves so as to advance the insulator 201 and the movable contacts 61 toward the stationary contact 60.

In the exploded view shown in Figure 1, the contacts are open and the toggle mechanism consisting of links 194 and 195 is collapsed. The circuit breaker may be closed by a variety of methods. The circuit can be closed manually by means of shaft 180 rotated by closing handle 184, described above. If shaft 180 is rotated in the direction indicated by the arrow 184A, the roller 179 will engage the bottom of arm 190 and force the arm 190 against roller 193, thus straightening out the toggle mechanism and closing the circuit breaker contacts.

The movable links 200 are under an opening tension by means of the opening spring 210 so that if no additional locking action other than described above for supporting the toggle existed, the circuit breaker would reopen immediately upon releasing the shaft 180. The locking device is supplied by means of a crank 211 which is located on a shaft 212 mentioned above, whose longitudinal axis is parallel to the axis of the milled shaft 170, and the rod 140. The crank 211 has two arms 213 and 214. The latch 213 is located, when the circuit breaker is open, adjacent the roller 193. When the roller 193 is forced upward, as due to the pressure of the arm 190, the roller pushes against arm 213 of crank 211, rotating the crank 211 slightly on shaft 212. When the roller 193 has cleared the top of latch 213, the prop latch 213 snaps underneath the roller 193 due to the compression of spring 220. The spring 220 which is wound on the shaft 212 has one end on an indentation 221 of crank 211 the other end borne against a shaft 222 which pierces the trip arm 185. The shaft 212 and 222 have been moved out of position in the exploded view for the sake of clarity. Actually, the shaft 222 pierces the trip arm 185 at point 207. The longitudinal axis of shaft 222 is essentially parallel to the longitudinal axis of shaft 212 and milled shaft 170.

When the roller 193 is moved, straightening the toggle it causes crank 211 to rotate compressing spring 220. The roller clears the top of prop latch 213 letting the crank rotate in the opposite direction until the arm 213 is directly beneath and supporting the roller 193. The other arm 214 of crank 211 bears against the shaft 222 preventing further rotation of the crank 211 so that the arm 213 is stopped directly beneath the roller 193. The spring 220 is under compression normally so that the arm 214 is constantly bearing against the shaft 222. When the toggle is straightened, the rotation of the crank 211 moves the arm 214 away from the shaft 222 until the roller 193 clears the top of prop latch 213. Then the reverse rotation of the crank 211 occurs until the arm 214 again bears against shaft 212.

Thus, when the toggle is straightened and the circuit breaker closed, the crank 211 locks the toggle 194—195 and thus locks the circuit breaker in a closed position.

The closing handle 184 by means of the shaft 180, after closing the circuit breaker by means of the rotation of roller 179 against the arm 190, as described above, is returned to its normal position by means of a crank 230. The crank 230 is pivoted on a stationary pin 231.

The crank 181 described above has an indentation 232 which meets a roller 233 of crank 230. The crank 230 supports pin 234 which has a restraining spring 235 engaged at one end 236. The restraining spring 235 is attached to an angle 237 and is tensed on the pin 236, causing the crank 230 to rotate. The rotation of crank 230 causes the roller 233 to meet the indentation 232 returning the crank 181 to its normal position.

The various positions of the operating mechanism are shown in Figures 3 through 6.

Figure 3 shows the closed position thereof, with link 195 pushed forward to raise the crank 200 and close the insulator 201 and contact arm 78 and with the roller 193 on the prop latch 213.

The latch arm 185 is shown in appropriate latching engagement with the milled shaft 170.

When the shaft 180 described above is turned to release the mechanism or on the occurrence of tripping conditions, the milled shaft 170 is rotated to permit the latch arm 185 to move into the milled section 186 of the milled shaft 170, as seen in Figure 4.

Then as seen in Figure 5, the roller 193 drops off the prop latch abutment 213 to open the circuit breaker.

Thereafter, as seen in Figure 6, the latch arm 185 is restored to its initial position and the milled shaft 170 is restored to latching position so that the circuit breaker may again be manually moved from the open position of Figure 6 to the closed position of Figure 3 by handle 180.

The circuit breaker may also be automatically closed by means of the latched control relay having coil 300 and armature 301 and the closing solenoid 241 which controls the closing plunger 240.

The circuitry for the automatic closing means is shown in Figure 7 and the details of the latch relay and closing solenoid are seen in Figures 1 and 7. A detailed description of the operation of the closing means shown in these figures is set forth in U. S. Patents 2,792,534, issued May 14, 1957, to Carl Thumim, entitled Solenoid Control Relay for Circuit Breakers; and 2,832,917, issued April 29, 1958, to Challis I. Clausing, entitled Anti-Pumping Closing Means for Circuit Breakers; and copending applications Serial No. 383,714, filed October 2, 1953, by Carl Thumim, entitled Circuit Breaker Anti-Pumping Device, and Serial No. 428,638 filed May 10, 1954, by Charles J. Yarrick, entitled New Control for Electrical Closing of Circuit Breaker, all of which are assigned to the assignee of the instant application.

Figure 7 illustrates the trip-free operation of the circuit breaker. Thus, for example, when the breaker is automatically closed by means of the control relay 300—301 and the closing solenoid 240—241, the circuit breaker will trip-free providing the above described trip latch 170 is opened as soon as a fault current flows through the contacts. That is, even though a continuous closing force may be applied to the breaker from the closing plunger 240 the circuit breaker will nevertheless trip-free, if the trip latch 170 is rotated.

As heretofore noted the trip latch 170 may be controlled by the overcurrent short time delay relay 139—142; however, as heretofore noted the breaker to which our invention is adapted is provided with an escapement type time delay for the operation of the armature 142.

Hence, if an attempt is made to either automatically close the breaker by means of the plunger 240 or manually close the breaker by means of the handle 184 on a fault line, the magnetic forces would tend to separate the cooperating contacts 60, 61.

The opening magnetic forces on cooperating contacts 60, 61 may be greater than the closing force which is derived from the energy flowing in the closing solenoid 241 or may be greater than the force derived when manually closing by handle 184. In this case the circuit breaker contacts 60, 61 will separate due to the magnetic forces, but the trip latch 170—186 will remain engaged since there is a time delay on the armature 142 which controls the position of the trip latch. It is also possible that only the arcing contacts of the circuit breaker will engage and remain in engagement since there is an insufficient force to close the circuit breaker against a fault, thereby damaging these contacts and the circuit breaker.

Hence, the components will attempt to assume the position in Figure 6. However, since a closing force will be continuously applied, thereby driving the plunger 240 upwardly, a second attempt will be made and the above noted operation will be repeated. Hence, there will be chattering or pumping of the cooperating contacts which will result in damage to the circuit breaker and line to be protected thereby.

Since the circuit is constantly being made and broken the armature 142 of the trip coil relay 139 will always be moved back to its neutral position, as seen in Figure 2. That is the current will not be permitted to flow for a sufficient length of time to allow the armature 142 to move from its energized position against the time delay created by the timer arm 500.

It is a primary object of our invention to provide means wherein the timer mechanism 73 will be ineffective to delay the operation of the overcurrent armature 142 when the circuit breaker is closed on a fault line and will remain ineffective to delay tripping until the contacts are closed and latched.

To this end, we provide a pivoted mounting for the timer housing 73 and a latch 532 therefor. When the circuit breaker is latched closed the timer housing 73 is latched so that rotation thereof is prevented thereby resulting in time delay trip. However, whenever the circuit breaker is opened, either due to a fault line, shunt trip 150 or manually by handle 184, the latch 532 will be removed so that the timer housing 73 is again pivotally mounted.

Hence, if the circuit breaker should be closed on a fault line, the movement of armature 142 would merely rotate the entire housing 73 through the timer arm 500 and an instantaneous tripping would result. After the main contacts are engaged, the latch 532 is again placed in the path of extension lever 531 so that the timer housing 73 is no longer pivotally mounted and hence, will introduce time delay to the automatic trip of the circuit breaker.

The detailed construction of our novel apparatus is as follows: Referring to Figures 1, 2, 7, 8 and 9, the timer housing 73 has a shaft 514 extending from one side thereof, as heretofore described, and has the timer arm 500 mounted thereon. The opposite side of the housing has a threaded shaft 533 in threaded engagement with the threaded recess 33. The shaft 533 is pivotally mounted about its longitudinal axis in any desirable manner. A latch arm 531 is rigidly secured thereto. It will be clearly seen in Figures 8 and 9 that the timer lever 500 and the latch lever 531 are on opposite sides of the timer housing 73. The timer arm 500 is positioned in the path of movement of the armature 142 to delay operation thereof, as heretofore described. In the position noted in Figure 2 the timer housing 73 is latched in position by latch lever 531 and latch 532 so that the timer housing 73 is not pivotally mounted and hence, will be effective to delay operation of the armature 142.

When a fault current sufficiently energizes the trip coil 139 the armature 142 will move from the solid position of Figure 2 to the dotted view of Figure 2, thereby rotating timer arm 500 in a counterclockwise direction, but will not rotate the timer housing 73 since it is latched in position by latch lever 531 and latch 532.

When the circuit breaker is moved from the closed position of Figure 2 to the open position of Figure 1, the contact bar 406 will rotate clockwise, as heretofore noted, thereby lifting link 502 through bell crank 503 which will rotate lever 507 to remove latch 532 from the path of movement of latch arm 531 as best seen in Figures 1 and 7.

The details of the unit is as follows: A bell crank 501, having an extension arm 503, is rigidly secured to the contact arm 406. A rod 502, is provided with an elongated slot 534 at one end thereof. A pin 504 is secured to the arm 503 of bell crank 501 and is received in the slot 534 of rod 502. The rod 502 is preferably made with threaded member sections 535 and 536 so that the effective length thereof can be properly adjusted after it is assembled in the circuit breaker. The lower end of the rod 502 is pivotally mounted on pin 506 of the latch lever 507. The latch lever 507 is rigidly secured to the shaft 510 which is free to rotate about its longitudinal axis. The shaft 510 extends past three poles of the circuit breaker and has a latch lever similar to 507 secured thereto at each pole for the purpose described. The end of the latch lever 507 opposite the pivotally connected pin 506 of rod 502 has a pin, a latch 532 extending perpendicular thereto and is secured thereto by screw 537. When the latch lever 507 is in the position indicated in Figure 2, the latch or pin 532 is positioned in the path of latch arm 531 so that the timer housing 73 cannot be rotated in a counterclockwise direction.

However, when the circuit breaker contacts 60, 61 are moved from engaged to disengaged position, the contact bar 406 is rotated in a clockwise direction, thereby lifting the tie rod 502 through bell crank 501. This causes latch lever 507 to rotate with shaft 510 about the longitudinal axis of this shaft. This movement of latch lever 507 thus lowers the latch 532 to the position of Figure 1 so that it is no longer in the path of movement of the latch arm 531.

It will be noted that neither the position of the timer housing 73, the latch arm 531 nor the timer arm 500 is altered by the operation above described. The spring 538, secured at one end to latch arm 531 and at the other end to a fixed point on the circuit breaker, maintains the latch arm 531 against the stop member 540 and hence there is no movement of the timer housing 73. Furthermore, since the trip armature is biased to its neutral position it will remain in this neutral position with the roller 522 of timer arm 500 in sliding engagement therewith.

If the circuit breaker is now closing on a fault line, the armature 142 will be rotated by the coil 139 in a clockwise direction against the bias of spring 539. Thus, as clearly seen in Figure 7, since the timer housing 73 is free to rotate, the armature 142 will drive the timer arm 500 and timer housing 73 counterclockwise against the bias of its spring 538. This will occur without intentional time delay and hence, there will be instantaneous trip with trip-free operation as seen in Figure 7.

After the circuit breaker contacts are disengaged and the coil 139 disengaged, the spring 539 will return the armature 142 to its neutral position and the biasing spring 538, will return the timer housing 73 to its neutral position as seen in Figure 1.

In the event the circuit breaker is closed on a normal line in which only rated current is flowing, then after the contacts 60, 61 are engaged (latched closed) and the downward movement of rod 502 will again rotate the latch lever 507 in a counterclockwise direction to thereby reengage the latch pin 532 with the latch arm 531, as best seen in Figure 2.

Hence, the timer housing 73 will again be rigidly mounted so that engagement of the timer arm 500 by the armature 142 will result in time delayed operation thereof.

In the drawings we have shown our invention in connection with one pole of a circuit breaker 30. However, it will be apparent to those skilled in the art that shaft 510, can extend past each pole of a multipole circuit breaker so that the control of the timer lever 500 is identical for each trip unit.

It will be noted that the control shaft 510 may be provided with time delay means so that the escapement timer 73 is not rendered operative until after the contacts 60, 61 have latched closed. Thus, as seen in Figure 2A the shaft 510 has an arm 510A rigidly secured thereto.

An escapement means 73A, which may be similar to escapement 73 described in connection with Figures 9 to 13, has a timer arm 500A which is positioned to be in the path of movement of the arm 500. Hence, the clockwise rotation of the shaft 510 will be time delayed by the timer 73A and timer arm 500A so that the circuit breaker will not have time delay characteristics until after the main contacts 60, 61 have latched closed.

It will be noted that in the usual installation of a circuit breaker of the type described to be used in a selective system the circuit breaker is provided with two armatures, one of which is for long time delay and the other for short time delay. As a rule the long time delay is achieved by means of a dash pot and the short time delay is achieved by means of an escapement mechanism.

The structural arrangement for the dual armature of the overcurrent coil and the time delay, therefore is shown in Figure 8 and clearly set forth in U. S. Patents 2,704,311 and 2,769,057.

In the foregoing, we have described our invention only in connection with preferred embodiments thereof. Many variations and modifications of the principles of our invention within the scope of the description herein are obvious. Accordingly, we prefer to be bound not by the specific disclosure herein, but only by the appending claims.

We claim:

1. In a circuit breaker having a pair of cooperating contacts having an initial engaged, a final engaged and a disengaged position, a trip means operatively connected to effect disengagement of said contacts, a timer mechanism operatively connected to said trip means to delay the operation of said trip means, said timer mechanism contained within a timer housing, said timer housing being pivotally mounted, latch means to prevent the rotation of said housing when said contacts are in said final engaged position to thereby effect time delay operation of said trip means; said latch means operatively connected to said circuit breaker and effective to permit rotation of said timer housing when said circuit breaker is in the disengaged and initial engaged position.

2. A circuit interrupter having a pair of cooperating contacts with an initial engaged, a final engaged and a disengaged position, a trip means operatively connected to effect movement of said contacts from said initial engaged to said disengaged position, a timer mechanism contained within a housing, a latch for said timer housing, said latch effective to cause time delay operation of said trip means when said latch is latched, said latch being moved to an unlatched position when said circuit breaker is in said disengaged and said initial engaged position; said latch effective to cause instantaneous operation of said trip means when said latch is unlatched.

3. A circuit interrupter having a pair of cooperating contacts with an initial engaged, a final engaged and a disengaged position, a trip means operatively connected to effect movement of said contacts from said initial engaged to said disengaged position, a timer mechanism contained within a housing, a latch for said timer housing, said latch operatively positioned to permit time delay operation of said trip means by said timer mechanism when said latch is latched, said latch operatively positioned to permit instantaneous operation of said trip means by said timer mechanism when said latch is unlatched; said latch operatively connected to and controlled by said circuit interrupter, said latch being latched by said circuit interrupter when said contacts are in said final engaged position, said latch being unlatched by said circuit interrupter when said contacts are moved from said final engaged position to said disengaged position, said circuit interrupter maintaining said latch unlatched until said contacts are moved past said initial engaged position to said final engaged position.

4. In a circuit breaker having a pair of cooperating contacts having an initial engaged, a final engaged and a disengaged position, trip means operatively connected to effect disengagement of said cooperating contacts on the occurrence of an overcurrent condition, a timer mechanism mounted in a housing and operatively positioned to delay the operation of said trip means, latch means to latch said timer housing in position when said contacts are in said final engaged position latch, said means automatically unlatching said timer housing when said contacts are in said disengaged position and said initial engaged position.

5. In a circuit interrupter having a pair of cooperating contacts with an initial engaged, a final engaged and a disengaged position, said circuit interrupter having a trip means operatively positioned to effect disengagement of said contacts, a time delay means operatively connected to said trip means, a housing for said time delay means, said housing being pivotally mounted when said contacts are in said initial engaged and disengaged position to thereby allow instantaneous operation of said trip means when said circuit interrupter is closed, latch means operatively connected to latch said housing against rotation about its pivot when said circuit interrupter contacts are moved past said initial engaged position to said final engaged position to thereby effect time delay operation of said trip means.

References Cited in the file of this patent

UNITED STATES PATENTS 839,079 Scott _____ Dec. 18, 1906

FOREIGN PATENTS 292,972 Germany _____ July 7, 1916